March 19, 1957 R. C. DUNN 2,785,956
EXTRACTION OF ALUMINA FROM ITS ORES
Filed Oct. 13, 1952 2 Sheets-Sheet 2
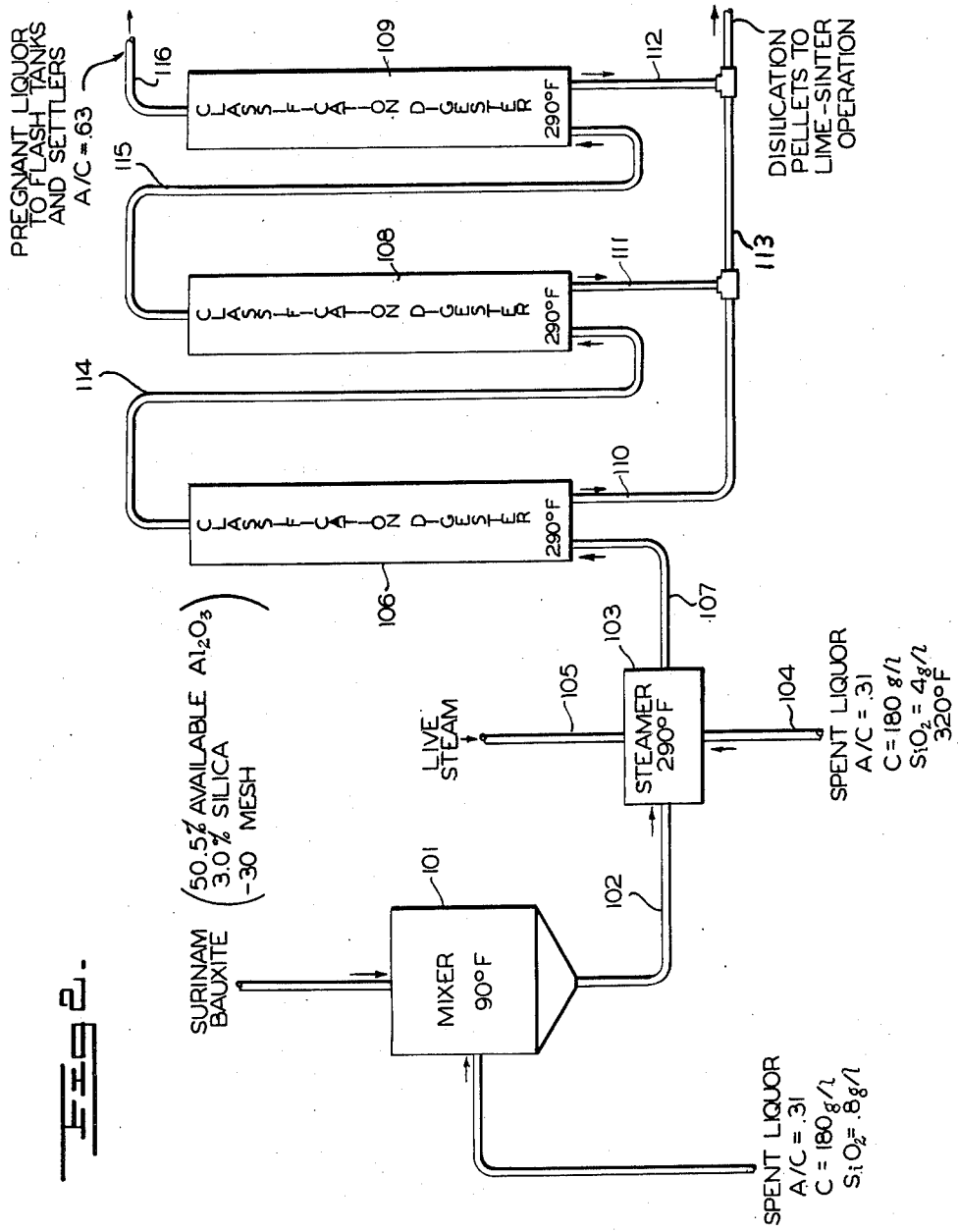
INVENTOR
ROBERT C. DUNN
BY James E. Toomey
ATTORNEY

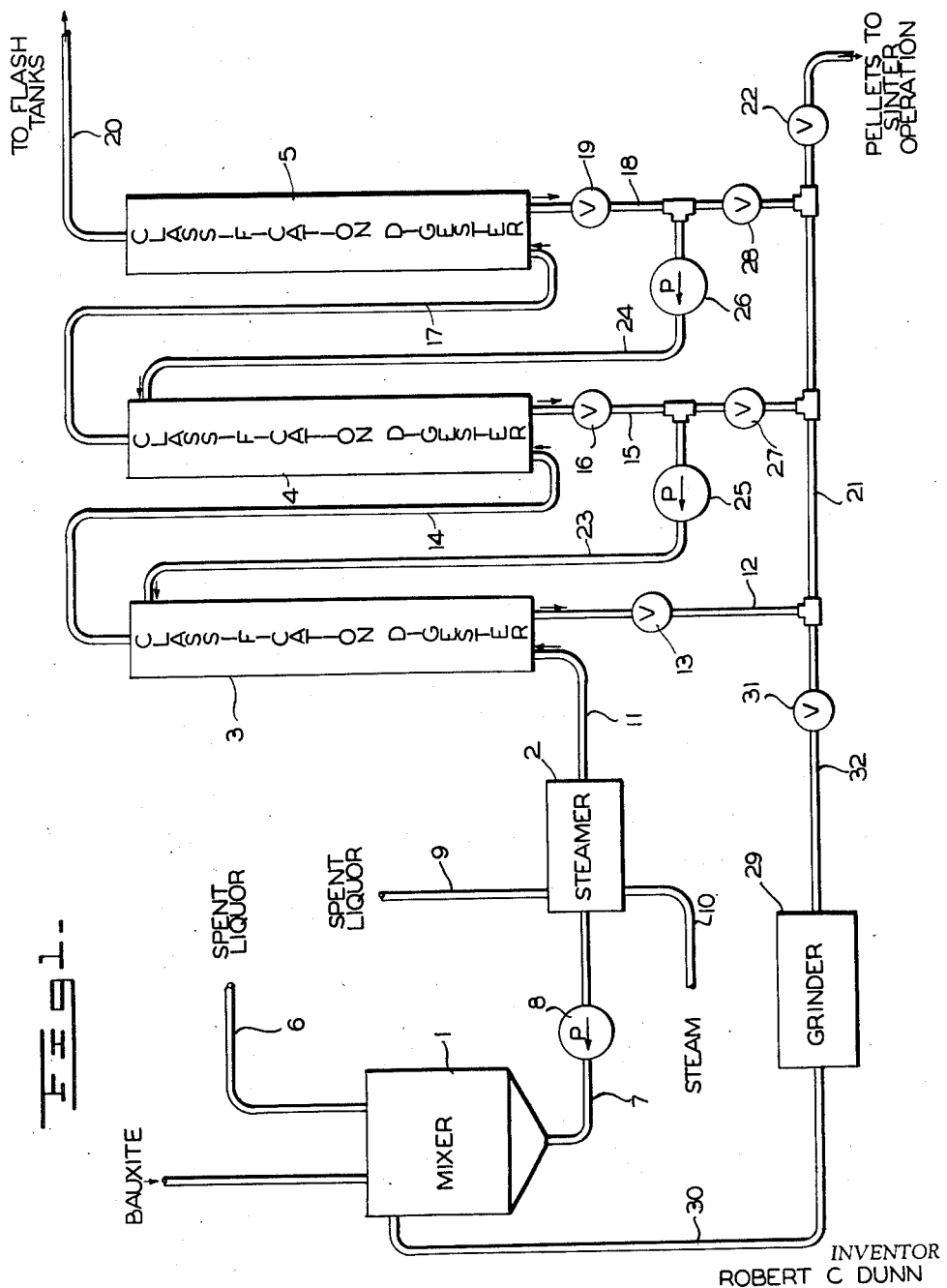

United States Patent Office 2,785,956
Patented Mar. 19, 1957

2,785,956

EXTRACTION OF ALUMINA FROM ITS ORES

Robert C. Dunn, San Carlos, Calif., assignor to Kaiser Aluminum & Chemical Corporation, Oakland, Calif., a corporation of Delaware Application October 13, 1952, Serial No. 314,520

7 Claims. (Cl. 23—143)

The invention described herein relates to improvements in the Bayer process for extraction of alumina from its ores, and more particularly relates to a method of obtaining a fraction of the Bayer process residues that is high in desilication products. Specifically, the invention relates to a method of and apparatus for classifying the undissolved silica particles and hard concretions, commonly referred to in the industry as "sand," from the major portion of the Bayer residues during the digestion phase, in such a manner as to cause substantial amounts of desilication products to form thereon.

The Bayer process as ordinarily practiced consists of the alkaline digestion of bauxites wherein the alumina is extracted, the separation of the alumina enriched liquors from the residues of digestion, the autoprecipitation of alumina hydrate from the supersaturated caustic aluminate liquors and finally, the calcination of the hydrate. After concentration, the spent liquor is recycled for further use in the digestion phase.

As is known in the industry, some forms of silica found in bauxites dissolve in the caustic Bayer liquors during digestion and come out of solution as complex sodium aluminum silicates. They crystallize in substantial amounts on the mechanical stirring apparatus as well as the shells and other parts of the digesters and lead lines. This necessitates periodic shutdown to allow descaling of the equipment.

Not only do the desilication products cause operational difficulties, but substantial amounts of alumina and soda are lost with the discarded digestion residues in the form of the complex sodium aluminum silicates. This loss has necessitated the addition of the well known lime-sinter step where high silica containing bauxites are processed. The lime-sinter process requires the sintering of the entire residue from the normal Bayer digestion process for the purpose of forming a leachable sodium aluminate from the complex silicates. Broad acceptance of this soda and alumina recovery process has not been attained because of the high production costs associated with sinter kiln operations.

According to the invention disclosed herein, the scaling problem may be substantially minimized and a residue fraction high in desilication products may be obtained. It is apparent that the greater amount of desirable products per unit of kiln feed, the less costly the recovery of soda and alumina in a sinter process. Moreover, the necessary time for digestion, which heretofore has been determined by the length of time necessary for desilication to take place, may be decreased with the beneficial saving in alumina which would otherwise be lost from what has been termed "reversion," i. e., the precipitation of soluble alumina as the monohydrate during a trihydrate extraction process.

We obtain the products of desilication in pellet form and separate the pellets from the main mass of digestion residue by means of a simple classification digester wherein entrained sand particles are held in a teetering position with respect to the upwardly moving mass of suspended material in the liquor during the digestion phase of the Bayer process and the desilication products are caused to form thereon. The terms "teetering position" and "state of teeter" are used to define the state of suspension of the sand particles with desilication products deposited thereon wherein the tendency of such particles to settle out is substantially counterbalanced by the force exerted on such particles by the flow of the upwardly moving mass of digestion liquor and finely suspended residues. It will be apparent that in actual operation this rate of upward flow of the moving mass will cause some carry-over to the next stage of these particles of relatively small particle size and also allow gradual settling out of the relatively large particles resulting from growth thereof due to desilication deposition.

Consequently, one object of this invention is to provide a digestion process whereby the entrained sand particles are held in a teetering position as regards the flowing liquor and material in suspension and thereby provide nuclei for the deposition of the complex sodium aluminum silicates.

Another object of the invention is to provide a new and novel process for obtaining a raw material for the lime-sinter step now associated only with the Bayer process when high silicate containing bauxites are processed.

Further objects and advantages will become aparent from the following drawings and description.

We have found that during the continuous digestion of bauxite substantial amounts of desilication products form on the entrained sand particles when such sand particles are held in a teetering position with respect to the upward moving suspended material, otherwise known in the industry as "red mud." As the cumulative build-up of the complex silicates takes place, the particles settle out and can be easily removed. A typical analysis of the pellets formed by this process of desilication during a trihydrate digest of Surinam bauxite is indicated in Table I.

TABLE I

Desilication pellet analysis

| | Percent |
|---|---|
| $CO_2$ | 1.44 |
| Loss on ignition | 8.08 |
| $SiO_2$ | 24.37 |
| $Na_2O$ | 16.13 |
| $Fe_2O_3$ | 17.62 |
| $TiO_2$ | 5.11 |
| $Al_2O_3$ | 26.97 |

On the basis of this analysis, 67% of the pellets are desilication products. The red mud residue from a Surinam digest ordinarily contains less than 30% desilication products. The usefulness of these high desilication products containing pellets for lime-sinter operations is obvious.

That the greatest amount of desilication takes place during the early stages of digestion is apparent where the digestion phase of the Bayer process takes place in a series of autoclaves or pressure type vessels because the scale formation is greatest in the vessels first in line. Extensive research has indicated that the solution of silica in Bayer liquors is relatively fast and for practical purposes, the concentration of the silica in the Bayer spent liquors may be considered at its highest point immediately after the bauxite and liquor reach digestion temperature. Thus, in ordinary plant practice a low temperature (about 90° F.) slurry of bauxite and spent liquor is made for pumping purposes. Under these conditions some soluble silica is dissolved but the temperature is low enough so that there is practically no desilication. Thereafter, this bauxite slurry is diluted with the major portion of the digestion spent liquor which has previously been heated to about digestion temperature in a live steamer wherein the temperature is brought almost immediately to that of digestion. It is at this point that the silica concentration in the solvent is considered the greatest.

Because the silica concentration is greatest at this time, the driving force for the formation of the complex sodium aluminum silicates is also greatest. This is understandable when one considers the overall reaction as taking place in two steps. First the soluble silica is dissolved into the spent liquor. Secondly, the soluble silica in solution precipitates as complex sodium aliuminum silicates. As regards the second reaction, the silica in solution is supersaturated. Consequently, the best results can be obtained by maintaining the concentration of sand and other nuclei particles at a higher level during the most active desilication stage of the digestion phase of the process.

The optimum concentration of particles during any one period of digestion is of course, variable depending on the type of digestion employed, i. e., whether monohydrate or trihydrate, the physical and chemical nature of the bauxite, as well as the predigestive processing and treatment of the ore such as fineness of grind.

Figure 1 diagrammatically illustrates the general arrangement of predigestion, digestion and classification stages which may be employed for carrying out the invention.

Figure 2 diagrammatically illustrates a typical arrangement for digesting Surinam bauxite under trihydrate conditions.

As shown in Figure 1, slurry mixer 1 is employed to mix the bauxite with a small amount of spent liquor for pumping purposes. Live steamer 2 serves the purpose of bringing the mud slurry and spent liquor to digestion temperature. Classification digesters 3, 4 and 5 are the zones wherein the products of desilication build up on the entrained sand particles.

Bauxite is slurried with spent liquor from line 6 in slurry mixer 1 and conveyed to live steamer 2 through line 7 by means of pump 8. Hot spent liquor is added to the mixture in live steamer 2 through line 9. At the same time the temperature of the solution is raised to digestion temperature by means of high pressure steam from line 10. After a short residence time in live steamer 2, the slurry continues through line 11 to classification digester 3.

The sand particles are swept upwards into classification digester 3 by the moving liquor and form nuclei for the deposition of the desilication products. As the particles build up with desilication products, they move downward countercurrent to the moving stream and settle at the base of the column wherein they are continuously bled off through line 12 by means of plug cock 13.

The sand particles which have not accumulated sufficient amounts of desilication products to settle out are carried with the red mud and liquor through classification digester 3 to classification digester 4 by means of line 14. The pellets which settle in digesters 4 and 5 are continuously bled off through lines 15 and 18 by means of plug cocks 16 and 19 respectively. The line 17 connecting classification digester 4 with classification digester 5 functions in the same manner as line 14. The pregnant liquor and remaining digestion residues are conveyed by means of line 20 to the flash tanks and subsequently to the settlers.

The pellets bled from the digesters 3, 4 and 5, through lines 12, 15 and 18, are transported through line 21 and valve 22 to the lime-sinter operation wherein the alumina and soda are recovered in a manner substantially the same as described in the Brown Patent No. 2,375,342. Although not shown on the diagram a settling tank for the pellets may be employed and the liquor which is bled off with the pellets returned to the system at a suitable point.

For the purpose of regulating the amount of nuclei on which desilication products may form during the more active periods of desilication, lines 23 and 24 are provided which lead from lines 15 and 18 respectively through pumps 25 and 26 to classification digesters 3 and 4. Thus, by closing valve 27 the concentration of pellets in classification digester 3 may be increased by withdrawing settled pellets from digester 4 through plug cock 16, line 5 and pumped by means of pump 25 through lines 23.

As the pellets from digester 4 settle in digester 3, added surface area or nuclei are provided therein for the deposition of desilication products.

Under ordinary running conditions the operation of pumps 25 and 26 for increasing the nuclei in the preceding digesters will be unnecessary because the operation of plug cocks 13, 16 and 19 may be so adjusted as to retain sufficient sand particles within the respective digesters.

As an alternate means of controlling the amount of nuclei in the system and indirectly the particle size obtained from the digesting columns, part of the desilication pellets may be transported back to the digestion system by way of slurry mixer 1. Thus, valve 31 may be adjusted so as to convey some of the particles through line 32 to grinder 29 and subsequently to slurry mixer 1 by means of line 30.

In this manner more nuclei will enter the digestion system and provide more surface area for the deposition of the desilication products. Consequently, the particle which may be bled from the digesters need not have been allowed as long a residence time within the digester as when less particles are present. This residence time of the particle and original size will, in turn, determine the final size of the pellets.

The object of the invention is to maintain the sand particles in a teetering position within the digesters until sufficient formation of desilication products has taken place on the sand particles. This may be accomplished by adjusting the upward flow of the liquor to a velocity which will cause the particles of sand to be swept upwards in the digester to as near the top of the digester as possible before sufficient desilication growth has taken place thereon and causes the pellet formed to settle out. When the particle weight has built up to the point where it settles out, further particle growth will take place as it descends to the bottom of the digester.

Since desilication takes place in subsequent digesters as well as the first digester in line, the velocity of the liquor during the first digesters in series should be selected to allow part of the sand particles to flow to those digesters next in line. The distribution of sand nuclei in this manner is facilitated by the variant particle sizes of sand found in the bauxite. Thus, the finest sand particles carry through the first digesters in series to those nearer the end of the system, whereas the coarser sand particles build up readily within the first digesters in series. Should the amount of sand nuclei be insufficient in digester 3, the pellets formed in digester 4 may be bled off through lines 15 and 23 through plug cock 16 and pumped by means of pump 25 to digester 3. In like manner the concentration of nuclei in digester 4 may be increased with pellets from digester 5.

In general, the greater amount of nuclei particles during the more reactive desilication stages of digestion the less nuclei needed near the end of the digestion period. The net effect of the presence of sand during the early stages of digestion is a substantial shortening of the time necessary for desilication to take place and less amounts of desilication products formed during the later stages of digestion.

Figure 2 is a diagrammatic example of a typical operation for the formation of desilication pellets wherein a Surinam bauxite is digested under trihydrate conditions. The values for alumina (A) and caustic (C) indicated are expressed as the equivalent $Al_2O_3$ and $Na_2CO_3$ respectively.

Previously ground bauxite and spent liquor are mixed in slurry tank 101 at 90° F. The mixture is pumped through line 102 to live steamer 103 wherein hot concentrated spent liquor and live steam are added through lines 104 and 105 respectively. The residence time in live steamer 103 should be as short as possible, being merely long enough for the solution to reach digestion temperature, because of the rapid rate of silica extraction and consequent desilication under the conditions indicated.

From live steamer 103 the slurry is led to classification digester 106 by means of line 107. A liquor velocity of from 2–4 feet per minute herein will allow sufficient sand retention for nuclei purposes. The desilication pellets formed are led from classification digester 106 by means of lines 110 and 113 to the lime-sinter operation. The smaller sand particles, undigested bauxite, mud residue and liquor are carried to classification digesters 108 and 109 by means of lines 114 and 115. The pellets formed therein are withdrawn from the digestion system by means of lines 111 and 112 to line 113 whereby they are led to the lime-sinter operation. The overflow from digester 109 is conveyed to the flash tanks and settlers by means of line 116.

When beginning operation, under the system outlined in Figure 2, it is preferable to maintain a low liquor velocity in the digesters until sufficient buildup of sand particles within the respective digesters has taken place. Mud and liquor analysis will provide the necessary information for the optimum concentration of particles in each digester. During this starting period, the pellets will settle out to considerable extent and provide nuclei at the bottom of the digesters. As the velocity of the liquor stream is increased the pellet concentration within the digesters may be maintained at the optimum concentration by continuously withdrawing them from the respective digesters through lines 110, 111 and 112.

Under optimum running conditions, the pellets formed in the above mentioned Surinam system vary from .003 inch to .125 inch diameter. Pellets formed in any one classification column however, seem to be relatively uniform in shape. An exemplary analysis of the pellets obtained is given on Table I.

It is to be understood that the number of classification columns utilized depends on the particular digester design, bauxite being processed and the operating conditions. Consequently, one or several digesters in series may be required. Moreover, the digestion phase of the process may consist first, of one or a series of classification digesters to be utilized during the more active desilication stages, and second, of autoclave type digesters during the less active desilication stages of digestion during the time the loss of alumina and soda are relatively less.

The essence of the invention is the maintaining of sand nuclei particles during the digestion phase in sufficient amounts to cause the products of desilication to form thereon and allowing the separation of the pellets formed from the main mass of mud and liquor. In this manner, the pellets may then become a raw material for soda and alumina recovery which is more concentrated in desirable constituents than before known. It is to be understood that the invention is not limited to practice of the illustrative embodiments set forth, and that, within the scope of the appended claims, the invention may be utilized other than as specifically described.

What is claimed is:

1. In the caustic digestion of aluminous ores wherein a digestion liquor contains insoluble ore residues including sand particles, and wherein a desilication product which is a complex sodium aluminum silicate is precipitated, a process of separating the sand particles and said desilication product from the liquor and the mass of undigested ore and insoluble ore residues and recovering the said sand and desilication product in pellet form, which comprises establishing and maintaining an upwardly flowing stream of said liquor and said mass at a rate of flow such that said sand particles are maintained in a state of teeter in said stream as nuclei for deposition of said desilication product thereon, said stream being established and maintained by passing digestion liquor upwardly from the bottom of a substantially vertical digestion zone and out through the top of said digestion zone, precipitating said desilication product upon the suspended sand particles in contact with the upwardly flowing liquor thereby forming progressively enlarged pellets, and removing the enlarged pellets which settle out of said stream in said digestion zone.

2. The process according to claim 1 in which the rate of flow of the upwardly flowing stream is between about 2 and 4 feet per minute.

3. A process according to claim 1 in which a portion of removed pellets is returned to the digestion liquor to increase the number of nuclei for deposition of desilication product thereby accelerating precipitation thereof.

4. In the continuous caustic digestion of aluminous ores wherein the digestion liquor contains insoluble ore residues including undissolved silica particles, and wherein a desilication product, which is a complex sodium aluminum silicate, is precipitated from the digestion liquor, a process of separating the silica particles and said desilication product from the liquor and the mass of insoluble ore residues and recovering the silica particles and desilication product in pellet form, which comprises establishing and maintaining a plurality of upwardly flowing streams of said liquor and said mass in a series of intercommunicating hydraulic classifying zones, said streams being established and maintained by passing digestion liquor upwardly from the bottom of the hydraulic classifying zones and out through the top of said hydraulic classifying zones at a rate of flow such that said silica particles are kept in a state of teeter in said streams in the classification zones as nuclei for deposition of desilication product thereon, the amount of nuclei for deposition of desilication product maintained in the liquor streams decreasing successively from the first to the last of the said hydraulic classification zones in the series, depositing desilication product upon the suspended silica particles in said zones in contact with the upwardly flowing liquor thereby forming progressively enlarged pellets of desilication product with silica nuclei, and removing the enlarged pellets which settle out of said streams in said hydraulic classifying zones.

5. A process according to claim 4 in which a portion of the removed enlarged pellets from a succeeding classification zone is introduced into a preceding classification zone to increase the amount of nuclei for deposition of desilication product.

6. A process according to claim 4 in which the rate of flow of the upwardly flowing streams is between about 2 and 4 feet per minute.

7. In the continuous caustic digestion of aluminous ores wherein the digestion liquor contains insoluble ore residues including insoluble siliceous material and previously dissolved siliceous material is precipitated from the digestion liquor in the form of a complex sodium aluminum silicate desilication product, a process of accelerating precipitation of said desilication product and separating the insoluble siliceous material and said desilication product from the mass of said undigested ore and insoluble ore residues and recovering the same in pellet form, which comprises establishing and maintaining an upwardly flowing stream of said digestion liquor containing said mass concurrently flowing therewith, by passing said stream of digestion liquor upwardly from the bottom of a substantially vertical digestion zone and out through the top of said digestion zone at a flow rate such that said insoluble siliceous material is suspended against the flow of said stream as nuclei for deposition of desilication product thereon, precipitating said desilication product from said liquor upon said suspended siliceous material thereby forming progressively enlarged pellets, and removing said enlarged pellets which settle out of said flowing stream in said digestion zone.

References Cited in the file of this patent

UNITED STATES PATENTS

| | | |
|---|---|---|
| 1,559,703 | Howard | Nov. 3, 1925 |
| 1,835,271 | Burke | Dec. 8, 1931 |
| 2,143,310 | Fulda | Jan. 10, 1939 |
| 2,244,194 | Haglund | June 3, 1941 |
| 2,405,275 | Stowe | Aug. 6, 1946 |
| 2,420,852 | Archibald | May 20, 1947 |
| 2,438,488 | Anderson | Mar. 30, 1948 |
| 2,604,379 | Archibald | July 22, 1952 |

OTHER REFERENCES

Taggart: "Handbook of Mineral Dressing," section 8, page 8–47 (one page only), J. Wiley and Sons, N. Y. 1945.